April 18, 1939.    H. A. BEEKHUIS, JR    2,155,372
PROCESS FOR THE PRODUCTION OF FERTILIZERS
Original Filed March 10, 1931
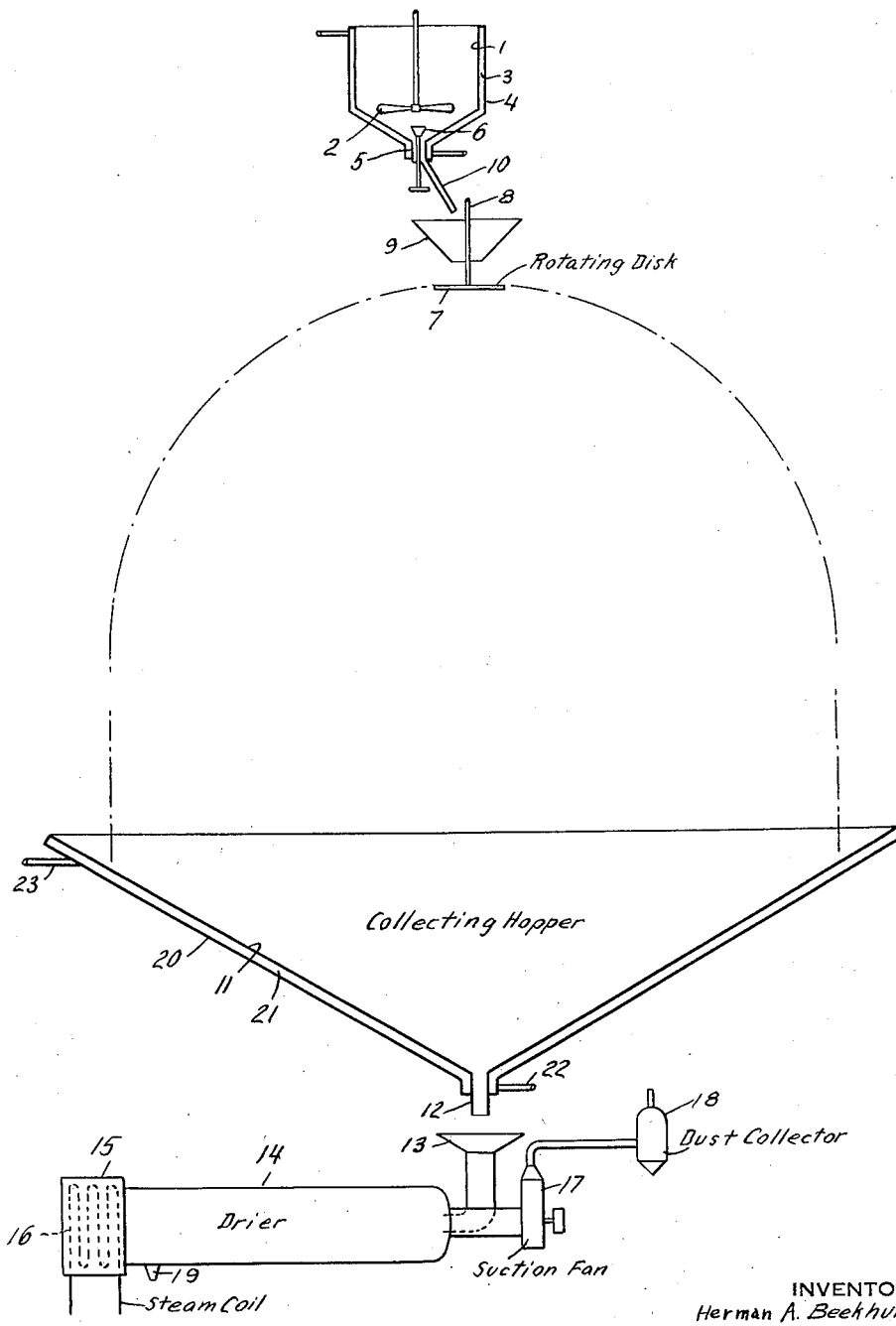
INVENTOR
Herman A. Beekhuis, Jr
BY
ATTORNEY Patented Apr. 18, 1939

2,155,372

UNITED STATES PATENT OFFICE 2,155,372

PROCESS FOR THE PRODUCTION OF FERTILIZERS

Herman A. Beekhuis, Jr., Petersburg, Va., assignor, by mesne assignments, to The Solvay Process Company, New York, N. Y., a corporation of New York Application March 10, 1931, Serial No. 521,482
Renewed April 10, 1937

2 Claims. (Cl. 71—60)

This invention relates to a process and apparatus for the production of fertilizers. More particularly, this invention relates to the production of a fertilizer in granular form containing ammonium nitrate and calcium carbonate and methods for their production.

It has heretofore been proposed to prepare a fertilizer by admixing crystalline ammonium nitrate with the calcium carbonate residues obtained in the production of ammonium sulfate by reaction of calcium sulfate in suspension in water with ammonia and carbon dioxide. The precipitated calcium carbonate formed as the result of this reaction is separated from the solution of ammonium sulfate and is admixed with the ammonium nitrate crystals. It has also been proposed heretofore to prepare granular fertilizers by allowing a hot concentrated solution or fusion of a fertilizer salt to cool while falling freely through a gaseous atmosphere. The dispersed fluid is solidified during its fall through the gas and a product consisting of more or less regular granules is obtained.

It is an object of this invention to provide a process for the production of a granular fertilizer comprising an intimate admixture of ammonium nitrate and finely divided calcium carbonate. Further, it is an object of this invention to provide an apparatus for the production of a fertilizer comprising ammonium nitrate and calcium carbonate in granular form. Other objects of the invention will in part be obvious and will in part appear hereinafter.

I have discovered that a granular fertilizer having satisfactory physical characteristics may be prepared by dispersing a concentrated solution of ammonium nitrate containing finely divided calcium carbonate into an atmosphere of a cooling gas.

In carrying out the process of this invention, a concentrated solution of ammonium nitrate containing suspended finely divided calcium carbonate, heated to a temperature at which the mixture is fluid, is dispersed as separate particles into an atmosphere of an inert gas having a temperature below the solidification temperature of the mixture. The particles are allowed to pass freely through the gas until they are sufficiently solidified to retain their shape upon being collected and to permit of their being fed to a drier wherein the solidified particles are dried. In its preferred embodiment, this invention comprises the addition of finely divided calcium carbonate to about a 90% ammonium nitrate solution at a temperature of about 100–120° C. The mixture is fed to a revolving disc from which it is dispersed into a body of air at about atmospheric temperature. The dispersed particles are cooled by falling through the air and are collected and immediately fed into a rotary drier. In the drier, the particles are treated with air heated to 50–120° C. while being agitated to prevent the granules from sticking together.

The invention accordingly comprises the several steps and the relation of one or more of such steps with respect to each of the others and the product possessing the features, properties and the relation of constituents which are exemplified in the following detailed disclosure and the scope of the invention will be indicated in the claims.

For a fuller understanding of the nature and objects of the invention, reference should be had to the following detailed description taken in connection with the accompanying drawing in which:

The numeral 1 indicates a vessel provided with a stirrer 2. Vessel 1 is arranged for heating by means of steam introduced into a space 3 provided in a steam jacket 4 about vessel 1. The bottom of vessel 1 is provided with a delivery spout 5 and trough 10. The entrance to spout 5 may be opened or closed as desired by means of a valve 6. Below vessel 1 is positioned a disc 7 connected by a spindle 8 with a motor, not shown, whereby disc 7 may be rapidly rotated. A funnel 9 surrounds spindle 8 and is positioned to guide a fluid flowing from trough 10 to the center of rotating disc 7. Below disc 7 there is a collecting hopper 11 which, in the apparatus shown, takes the form of an inverted cone provided at its apex with a delivery tube 12. The sides of collecting hopper 11 are at such an angle with the horizontal that a solid material falling thereon moves under the influence of gravity toward and through delivery tube 12, below which is positioned a funnel 13, the delivery tube of which opens into a rotary drier 14. The walls of collecting hopper 11 may be provided with a jacket 20 which forms a space 21 between the walls of the hopper and the jacket. If desired, a warming fluid, for example warmed air, may be circulated through the space within jacket 20 from an inlet 22 to an outlet 23 to warm the walls of collecting hopper 11. An air heater 15 containing steam coils 16 serves to warm air drawn through the heater and drier 14 by means of an exhaust fan 17. The exhaust gas passes from fan 17 through a dust collector 18 and thence is discharged to the atmosphere. The material treated in the drier leaves the same through a discharge 19 and may be cooled and packed for shipment.

The following examples are representative of processes which may be carried out employing the apparatus described above:

*Example I.*—A 90% ammonium nitrate solution is added to vessel 1 and heated to a temperature of 100–105° C. by means of steam passed into jacket 4. Finely divided calcium carbonate is added to the ammonium nitrate solution in the proportion of about 80 lbs. of the calcium carbonate to every 100 lbs. of the ammonium nitrate solution and the mixture stirred to maintain the calcium carbonate in suspension in the solution. The mixture at 100–105° C. is allowed to flow past delivery valve 6 through spout 5 and trough 10 to the center of rotating disc 7 which throws the mixture outwardly therefrom in the form of more or less spherical particles. These spheres are allowed to fall through air or other inert gas for such a distance that they are sufficiently solidified to retain their shape on striking collecting hopper 11. The solidified pebbles pass downwardly along the sides of the collecting hopper through delivery tube 12 and funnel 13 into the rotary drier 14 where they are dried by heated air drawn through heater 15. The product leaving discharge 19 may contain not more than about 0.25% moisture.

It has been found that the pebbled material has a tendency while being dried to adhere to the walls of rotary drier 14 and to form a small amount of relatively large lumps. These larger lumps may be removed by screening the product delivered from the rotary drier. This tendency of the material to cake during drying and to adhere to the sides of the rotary drier may be materially lessened by introducing calcium carbonate dust, for example, pulverized limestone, with the air drawn through drier 14. The dust which leaves the drier with the air is recovered in dust collector 18.

*Example II.*—A mixture of 90% ammonium nitrate solution and finely divided calcium carbonate in proportions of about 150 lbs. calcium carbonate to every 100 lbs. of ammonium nitrate solution is prepared and heated in vessel 1 as described in Example 1 above. The mixture at about 100–105° C. is fed at a uniform rate to the center of disc 7. This disc, for example, may have a diameter of six inches and be rotated at a speed of about 765 revolutions per minute. The mixture is thrown from the disc in the form of separate particles which are allowed to harden by falling through air for a distance of about 40 feet to collecting hopper 11. The hardened particles pass from the collecting hopper to rotary drier 14 where they are treated in the manner described in Example I.

*Example III.*—A mixture of ammonium nitrate and finely divided calcium carbonate is prepared by adding the calcium carbonate to about a 95% ammonium nitrate solution at a temperature of about 110–120° C. in the proportions of about 40 lbs. of calcium carbonate to every 100 lbs. of ammonium nitrate solution. The mixture is introduced into vessel 1, where it is maintained at a temperature of about 100–105° C. The slurry is solidified in the form of granules in the manner described in Examples I or II and the pebbles from the collecting hopper 11 are treated in drier 14 with air introduced into the discharge end of the drier at a temperature of 50–120° C. The operation of the drier should be so regulated that the temperature in the drier at the end to which the pebbled material is fed does not exceed about 100° C. as otherwise there is a tendency for the pebbles to disintegrate.

The rotating disc and collecting hopper employed in carrying out the process of this invention may be placed in a large room without particular provision being made to maintain a current of air flowing counter-current to the falling particles of the material. If desired, however, a counter-current of air or other gas inert to the material being treated may be circulated in contact therewith. If atmospheric conditions make it necessary or desirable to adjust the water vapor content of the air or its temperature, air properly conditioned with respect thereto may be circulated into the zone of falling particles. It has been found that when the humidity of the air through which the dispersed particles fall is relatively high, for example above about 60–80%, there is a tendency for the particles to stick to the sides of the collecting hopper. This sticking may be prevented by conditioning the air. It has likewise been found that the sticking of the particles to the collecting hopper may be obviated by warming the collecting hopper. For this purpose, a fluid at a desired temperature may be introduced into jacket 20 shown in the apparatus of the drawing and circulated in the space therein about the sides of the collecting hopper to warm it to a temperature at which the granules do not adhere thereto. The mixture of ammonium nitrate and calcium carbonate may be dispersed into the cooling gas at lower temperatures than 100° C., but lower temperatures are not preferred as both the moisture content of the melt and length of fall of the droplets should then be increased in order to maintain the slurry sufficiently fluid for dispersion employing the preferred form of the apparatus and to permit the dispersed fluid to solidify sufficiently before striking the walls of the collecting hopper. With other forms or types of spraying apparatus, however, it may be desirable to disperse the materials at a lower temperature than 100° C. and this invention is not limited to the particular details of operation set forth above. A temperature materially above 110–120° C. for the treatment of a mixture of ammonium nitrate and calcium carbonate is not advantageous since high temperatures favor a reaction between these materials.

The calcium carbonate employed for admixture with the ammonium nitrate may be in the form of pulverized limestone, marl or oyster shells, or of precipitated calcium carbonate and its proportion in the mixture may be varied from 1% to 60% or more. Other finely divided materials inert to ammonium nitrate, such as finely ground sand, may be employed either in addition to or as a substitute for calcium carbonate in the production of fertilizers in accordance with the process described above. Calcium carbonate, however, is preferred as it is a soil conditioner, and I have found it advantageous to use the calcium carbonate formed in the production of ammonium chloride from calcium chloride, ammonia and carbon dioxide.

Since certain changes in carrying out the above process and certain modifications in the composition which embody the invention and in the apparatus for practicing the principle thereof may be made without departing from its scope, it is intended that all matter contained in the above description or shown in the accompanying drawing shall be interpreted as illustrative and not in a limiting sense. The fertilizer product described may be admixed with other ingredients if desired or may be applied alone to the soil.

In my copending application Serial No. 729,087 I also describe and claim as my invention the procedure hereinabove described involving the treatment of the pebbles in drier 14 with air carrying in suspension finely divided inert material.

I claim:

1. The process of producing a granular fertilizer which comprises preparing a fluid mixture containing ammonium nitrate and an inert solid in finely divided form, dispersing said fluid mixture in the form of separate particles into a cooling gas, solidifying said particles during their travel through said gas, allowing said particles to fall upon the sides of a collecting hopper, removing the solid particles from said collecting hopper to a dryer, and warming the walls of the collecting hopper.

2. The process of producing a granular fertilizer which comprises preparing a fluid mixture containing ammonium nitrate and finely divided calcium carbonate, dispersing said fluid mixture in the form of separate particles into a cooling gas, solidifying said particles during their travel through said gas, allowing said particles to fall upon the sides of a collecting hopper, removing the solid particles from said collecting hopper to a dryer, and warming the walls of the collecting hopper.

HERMAN A. BEEKHUIS, Jr.